US012510513B2

(12) United States Patent
Van Neer et al.

(10) Patent No.: US 12,510,513 B2
(45) Date of Patent: Dec. 30, 2025

(54) ACOUSTIC MICROSCOPE SYSTEM AND METHOD FOR MEASURING AN OBJECT DISPOSED IN A MEDIUM

(71) Applicant: Nederlandse Organisatie voor toegepast-natuurwetenschappelijk onderzoek TNO, 's-Gravenhage (NL)

(72) Inventors: Paul Louis Maria Joseph Van Neer, Bergschenhoek (NL); Maurits Sebastiaan Van Der Heiden, 's-Gravenhage (NL); Michiel Peter Oderwald, Delft (NL)

(73) Assignee: Nederlandse Organisatie voor toegepast-natuurwetenschappelijk onderzoek TNO, s-Gravenhage (NL)

( * ) Notice: Subject to any disclaimer, the term of this patent is extended or adjusted under 35 U.S.C. 154(b) by 375 days.

(21) Appl. No.: 18/272,031

(22) PCT Filed: Jan. 19, 2022

(86) PCT No.: PCT/NL2022/050020
§ 371 (c)(1),
(2) Date: Jul. 12, 2023

(87) PCT Pub. No.: WO2022/158972
PCT Pub. Date: Jul. 28, 2022

(65) Prior Publication Data
US 2023/0408452 A1 Dec. 21, 2023

(30) Foreign Application Priority Data

Jan. 20, 2021 (EP) ..................................... 21152574

(51) Int. Cl.
*G01N 29/06* (2006.01)
*G01N 29/04* (2006.01)
(Continued)

(52) U.S. Cl.
CPC ....... *G01N 29/0681* (2013.01); *G01N 29/043* (2013.01); *G01N 29/075* (2013.01);
(Continued)

(58) Field of Classification Search
CPC ............. G01N 29/0681; G01N 29/043; G01N 29/075; G01N 29/221; G01N 29/24;
(Continued)

(56) References Cited

U.S. PATENT DOCUMENTS

2006/0201252 A1* 9/2006 Georgeson ......... G01N 29/2481
73/641
2016/0109603 A1* 4/2016 Jin .......................... E21B 49/06
73/152.58
2022/0178731 A1* 6/2022 Bivolarsky .......... G01N 29/032

OTHER PUBLICATIONS

European Patent Office, International Search Report in corresponding International Application No. PCT/NL2022/050020, dated Apr. 21, 2022 (2 pages).
(Continued)

*Primary Examiner* — Benjamin R Schmitt
(74) *Attorney, Agent, or Firm* — Leydig, Voit & Mayer, Ltd.

(57) ABSTRACT

An acoustic microscope system is described that includes a container for holding a medium with an object to be measured. Compressional waves are generated by a probe into the medium. The compressional waves travel along an acoustic axis to interact with the object. Shear waves are generated by a shear wave source into the medium. The shear waves travel along a secondary axis which intersects with the acoustic axis at the object with a non-zero angle. The shear waves are configured to cause shear wave oscillations directed transverse to the secondary axis and at least partially directed along the acoustic axis. A measurement of the object is determined based on the compressional waves
(Continued)

having interacted with the object as a function of the generation of the shear waves.

20 Claims, 3 Drawing Sheets

(51) Int. Cl.
*G01N 29/07* (2006.01)
*G01N 29/22* (2006.01)
*G01N 29/24* (2006.01)
*G01N 29/34* (2006.01)

(52) U.S. Cl.
CPC ........... *G01N 29/221* (2013.01); *G01N 29/24* (2013.01); *G01N 29/348* (2013.01); *G01N 2291/011* (2013.01); *G01N 2291/012* (2013.01); *G01N 2291/02475* (2013.01); *G01N 2291/0421* (2013.01); *G01N 2291/0422* (2013.01); *G01N 2291/104* (2013.01)

(58) Field of Classification Search
CPC ........... G01N 29/348; G01N 2291/011; G01N 2291/012; G01N 2291/02475; G01N 2291/0421; G01N 2291/0422; G01N 2291/104
See application file for complete search history.

(56) References Cited

OTHER PUBLICATIONS

Stefano E Romero et al., "A comparative study between parallel and normal excitation for crawling wave sonoelastography," Proc. of SPIE, vol. 10160, pp. 101601G-1 to 101601G-8 (2017).
Kenneth Hoyt et al., "Real-Time Shear Velocity Imaging Using Sonoelastographic Techniques," Ultrasound in Med & Biol., vol. 33, No. 7, pp. 1086-1097 (2007).
Donald W. Baker, "Pulsed Ultrasonic Doppler Blood-Flow Sensing," IEEE Transactions on Sonics and Ultrasonics, vol. SU-17, No. 3, pp. 170-185 (Jul. 1970).
M. Melo Mota et al., "Generating a pencil beam from a focused transducer using Stolt migration," 2013 Joint UFFC, EFTF and PFM Symposium, pp. 982-985 (2013).
Yoshiki Yamakoshi et al., "Ultrasonic Imaging of Internal Vibration of Soft Tissue Under Forced Vibration," IEEE Transactions on Ultrasonics, Ferroelectrics, and Frequency Control, vol. 37, No. 2, pp. 45-53 (1990).

* cited by examiner

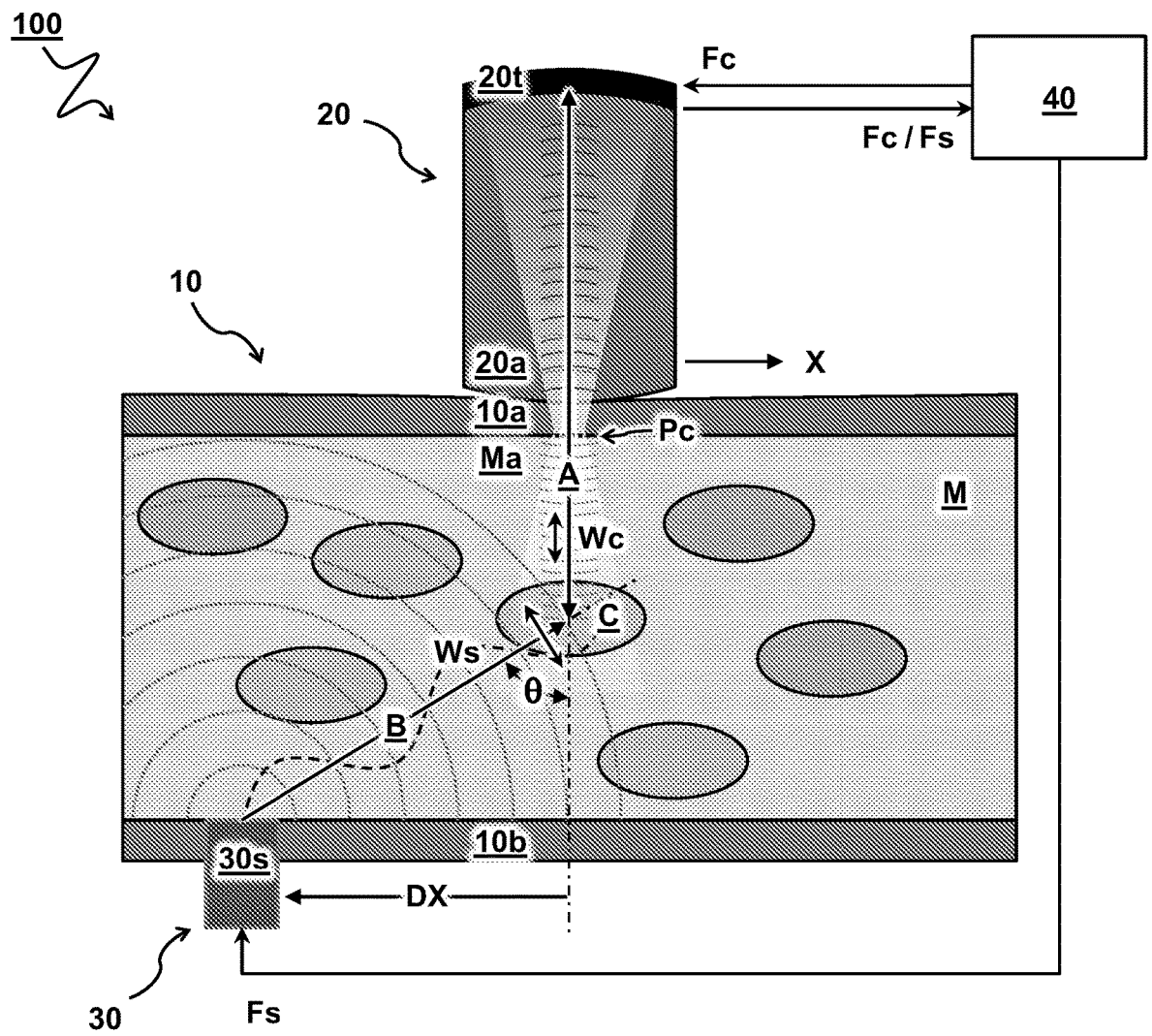
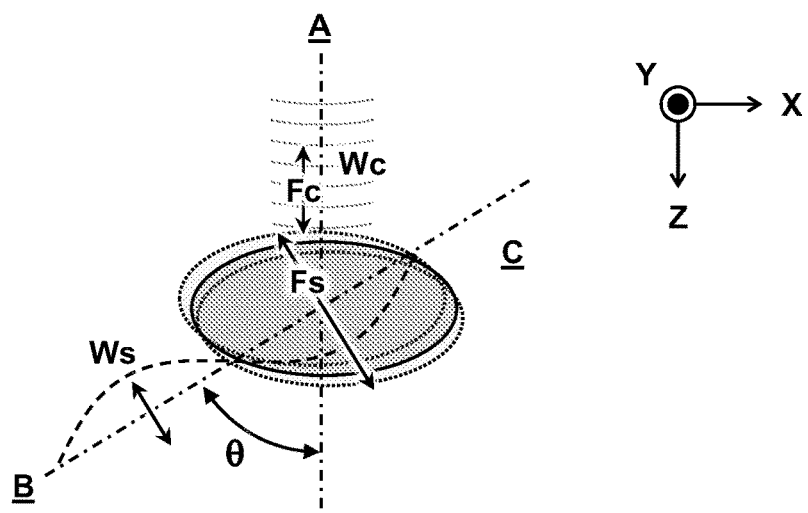
FIG 1A
FIG 1B

ACOUSTIC MICROSCOPE SYSTEM AND METHOD FOR MEASURING AN OBJECT DISPOSED IN A MEDIUM

CROSS-REFERENCE TO RELATED APPLICATIONS

This patent application is a U.S. National Phase of PCT International Application No. PCT/NL2022/050020, filed Jan. 19, 2022, which claims priority to European Application No. 21152574.6, filed Jan. 20, 2021, which are both expressly incorporated by reference in their entireties, including any references contained therein.

TECHNICAL FIELD AND BACKGROUND

The present disclosure relates to an acoustic microscope system, e.g. as part of a lab-on-chip design, and methods for measuring objects, such as cells, disposed in a medium.

Organ-on-chip concepts can be used for the study of diseases such as cancer and the cost-effective development of medicines. Using such devices many variations can be measured in a parallel fashion under controlled circumstances, e.g. variation of conditions or variations in origin of cells (stratification/personalized medicine). For example, changes in cell viscoelasticity can be used to characterize, monitor and identify (cancerous) cells, including the stage of tumor aggressiveness and progression. Hence, the cell (visco)elasticity may serve as both a mechanobiological marker for the onset of cancer but also have prognostic qualities. So there is a need to measure the development of cell (visco) elasticity over time in 3D at high resolution (e.g. with organ on chip concepts) while the cell/organoid is minimally affected by the measurement concept. In particular, there is a need for an improved acoustic microscope system, e.g. capable of measuring compressional/shear stiffness of cells and/or imaging of the cell and organoid geometry.

SUMMARY

Aspects of the present disclosure relate to an acoustic microscope system. The acoustic microscope system comprises an acoustic probe with at least one compressional wave transducer. The compressional wave transducer is configured to generate and inject compressional waves at a compressional wave frequency into a medium. The compressional waves are generated to travel along an acoustic axis to interact with an object disposed in the medium, and the acoustic probe is configured to measure the compressional waves having interacted with the object.

The acoustic microscope system further comprises a shear wave source with at least one shear wave element disposed at a lateral offset with respect to the acoustic axis of the acoustic probe. The shear wave element is configured to generate and inject shear waves at a shear wave frequency into the medium. The shear waves are generated to travel along a secondary axis which intersects with the acoustic axis at the object with a non-zero angle between the axes. The shear waves are configured to cause shear wave oscillations directed transverse (perpendicular) to the secondary axis and at least partially directed along the acoustic axis. Accordingly, the shear waves can further interact with the object to cause a change in the compressional waves having interacted with the object and measured by the acoustic probe. The acoustic microscope system comprises a processor configured to determine a measurement of the object based on the measured compressional waves having interacted with the object as a function of the (generation of the) shear waves interacting with the object.

Other or further aspects of the present disclosure relate to a method for measuring an object disposed in a medium. Compressional waves are generated at a compressional wave frequency and injected into the medium. The compressional waves travel along an acoustic axis to interact with the object. Shear waves are generated at a shear wave frequency and injected into the medium to travel along a secondary axis which intersects with the acoustic axis at the object with a non-zero angle. The shear waves are configured to cause shear wave oscillations directed transverse to the secondary axis and at least partially directed along the acoustic axis for further interacting with the object to cause a change in the measured compressional waves having interacted with the object. The compressional waves are measured after they have interacted with the object while the shear waves further interact with the object. A measurement of the object is determined based on the measured compressional waves having interacted with the object as a function of the generation of the shear waves interacting with the object.

BRIEF DESCRIPTION OF DRAWINGS

These and other features, aspects, and advantages of the apparatus, systems and methods of the present disclosure will become better understood from the following description, appended claims, and accompanying drawing wherein:

FIG. 1A illustrates an acoustic microscope system;

FIG. 1B illustrates compressional and shear waves interacting with an object;

DESCRIPTION OF EMBODIMENTS

Figure 2A:
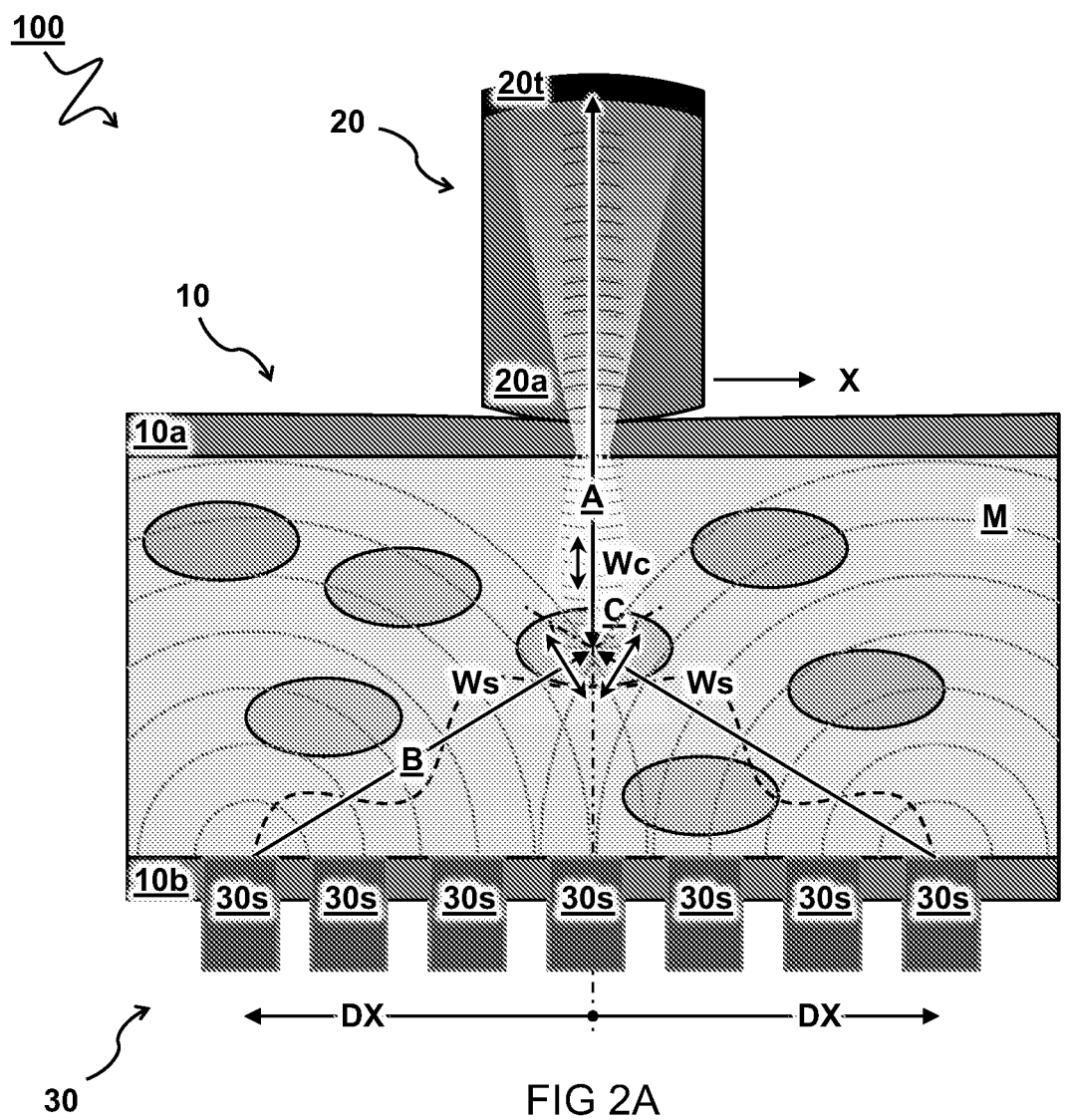
FIG. 2A illustrates an acoustic microscope system with multiple shear wave elements.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1A illustrates an acoustic microscope system 100 for measuring one or more objects C in a medium M. FIG. 1B illustrates acoustic waves Wc, Ws interacting with an object C. Aspects described herein with reference to the acoustic microscope system can also be embodied as a corresponding method for measuring an object C in a medium M.

In some embodiments, the system comprises or couples to a container 10. For example, the container 10 is configured to hold the medium M and/or the object C to be measured. In a preferred embodiment, the medium M comprises or essentially consists of a solid, viscous liquid, gel, or tissue. Examples of a suitable medium may include one or more of tissue or tissue mimicking material, matrix, matrix mimicking material, gels (gelatin, agar, fat, etc.), gels/matrix/liquid including (1 or more) cells/layers of cells/organoids/spheroids. (3D printed) phantoms mimicking tissue, organs, etc. or structures including tissue mimicking material (sponge including organoids/spheroids and liquids such as media Also other types of medium capable of conducting shear waves can be envisaged. It is noted that the medium may also partially consist of water or other liquid at least capable of conducting the compressional waves, even if such medium is not suitable for conducting shear waves. In one embodiment, the object C is connected to the at least one shear wave element 30$s$ via a path/medium capable of conducting the shear waves Ws while a path to the acoustic probe 20 may be formed through a different path/medium.

In one embodiment, the object C comprises a microscopic structure whose material properties are to be measured and/or imaged. In a preferred embodiment, the objects are (biological) cells that are measured and/or imaged by the acoustic microscope system 100. For example, the (biological) cell to be measured is part of a tissue, e.g. organoid, connected to the bottom 10$b$ of the container 10. In general, the compressional waves Wc are able to travel through watery liquids so the top acoustic probe 20 does not have to be in contact with the tissue. Also other objects can be measured, e.g. comprising soft materials. For example, the present methods can be used inspect composites, or materials comprising e.g. solids in a soft matrix. Typically, the object C to be imaged can be relatively small, e.g. having a diameter less than one millimeter. For example, the objects can have a diameter in a range between one micrometer and one hundred micrometer.

In some embodiments, the container 10 is formed as a tube, e.g. as part of a flow cell. For example, the acoustic microscope system 100 can be embodied as a lab-on-chip, possibly combined with other measurements such as optical measurements of the one or more object. In one embodiment, different measurements of the object are combined and analyzed using a machine learning, e.g. deep learning, algorithm to classify the objects. In another or further embodiment, an organ-on-chip is configured to measure properties of cells related to their biophysical and/or biochemical phenotype, e.g. in relation to a respective drug administered to the cells. For example, biophysical properties such as the cell mass and density, cytoskeletal architecture, cell stiffness, cell reflectivity, organoid stiffness and 3D imaging, and biochemical properties such as single-cell sequencing, can be combined to determine drug efficacy.

In some embodiments, the system comprises or couples to an acoustic probe 20. For example, the acoustic probe comprises at least one compressional wave transducer 20$t$. In one embodiment, the compressional wave transducer 20$t$ is configured to generate and inject compressional waves Wc into the medium M. For example, the compressional waves Wc are generated at a compressional wave frequency Fc. Typically, the compressional waves Wc are generated to travel along an acoustic axis A to interact with the object C. For example, the acoustic axis A is a central axis or axis of symmetry of the compressional waves Wc and/or the acoustic probe 20. Preferably, the compressional waves Wc are generated to converge towards with a focus Pc along the acoustic axis A. In one embodiment, the same and/or another compressional wave transducer 20$t$ of the acoustic probe 20 is configure to measure the compressional waves Wc having interacted with the object C. In one embodiment, the acoustic probe 20 comprises a piezo-electric transducer. In another or further embodiment, the acoustic probe 20 comprises an integrated opto-acoustical sensor or transducer to enhance sensitivity, e.g. for imaging of live cells. Of course also other types of transducers can be used, e.g. cMUTs (capacitive Micromachined Ultrasound Transducers) or pMUTs (piezo-electric Micromachined Ultrasound Transducers).

In some embodiments, the system comprises or couples to a shear wave source 30. For example, the shear wave source 30 comprises at least one shear wave element 30$s$. Preferably, the at least one shear wave element 30$s$ is disposed at a lateral offset DX with respect to the acoustic axis A of the acoustic probe 20. Most preferably, at least one shear wave element 30$s$ is disposed opposite the container 10 from the acoustic probe 20 on one side 10$a$ but laterally offset on the other side 10$b$. For example, as shown in the figures, the acoustic axis A is directed from the first side 10$a$ of the container 10 towards the second side 10$b$ of the container 10. In other words, the acoustic axis A (or line coinciding with the acoustic axis A) may intersect the opposite side 10$b$ of the container where the at least one shear wave element is placed (as well as the proximal side 10$a$ wherein the at least one compressional wave transducer is placed).

Figure 3A:
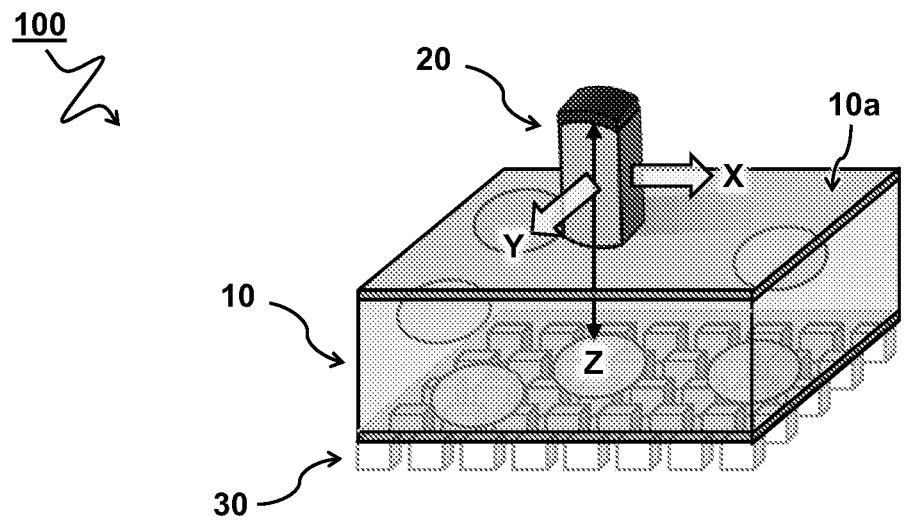
FIG. 3A illustrates an acoustic probe scanned along different dimensions of a container.
Figure 3B:
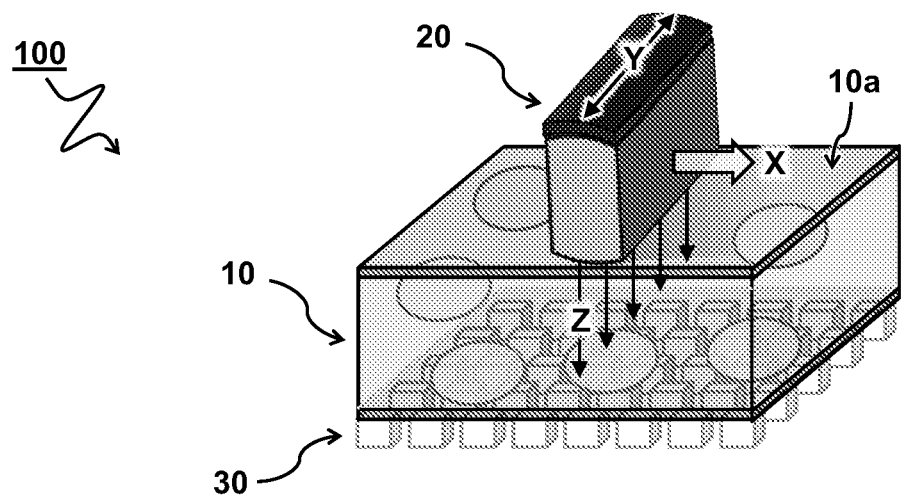
FIG. 3B illustrates an acoustic probe elongated in a first dimension scanned along a second dimension of the container.
Figure 3C:
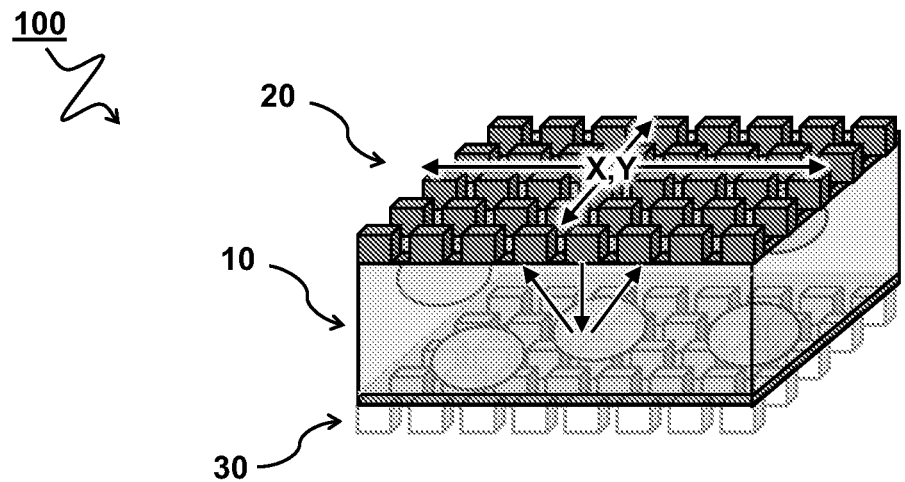
FIG. 3C illustrates an acoustic probe comprising a two-dimensional array of compressional wave transducers.

In some embodiments, placing the acoustic probe 20 and shear wave generator 30 on opposite sides 10$a$,10$b$ of the container/medium can help to alleviate direct vibrational interference compared to a configuration wherein the acoustic probe 20 and shear wave generator 30 are placed next to each other on the same side 10$a$ of the container (actuating the same surface), or on adjacent perpendicular sides of the container (where the external shear wave source may actuate the container in the same direction as the compressional wave transducer). Furthermore, in the present configuration the respective devices can each occupy any parts of the respective opposite surfaces without physically restricting each other or creating a blind zone. Furthermore, the present configuration enables various scanning applications such as shown in FIGS. 3A-3C.

In some embodiments, the present methods and systems are used to measure a shear wave supporting sample such as a cell culture or culture of organoids. In one embodiment, the sample is disposed, e.g. grown, on one side of the container (e.g. well or test chamber), typically the bottom side. For example, when investigating the shear wave properties of samples such as cells, or clumps of cells, it is desired to provide a continuous shear wave path into those cells. In other words it is desired to provide a path through a medium which sufficiently supports shear waves to travel from the shear wave source to the object unimpeded. In another or further embodiment, a shear wave supporting sample disposed on one side of the container is surrounded by a liquid that may limit propagation of shear waves but which liquid may still allow sufficient propagation of compressional waves. In these and other applications, it can be advantageous to provide the shear wave and compressional wave transducers on opposite sides of the container. Furthermore, having unrestricted access from the other side, e.g. top, may facilitate scanning using a compressional wave transducer In some embodiments, the opposite sides $10a,10b$ of the container 10 are planar and/or aligned in a (plane)-parallel fashion. In one embodiment, the opposite sides $10a,10b$ of the container 10 having respective surface normal vectors that are at least approximately in the same direction, e.g. cross at an angle of less than forty-five degrees, preferably less than thirty degrees, more preferably less than ten degrees, most preferably less than five degrees, e.g. zero degrees. It can also be envisaged to use a container having one or more approximately planar or even non-planar opposite sides intersected by an acoustic axis (not shown).

In some embodiments, a distance between the opposite sides $10a,10b$ of the container is relatively small, e.g. less than ten centimeter, less than one centimeter, less than one millimeter, e.g. down to one hundred micrometer, or even less. For example, the container comprises plates holding a cell culture there between. The smaller the distance between the opposite sides $10a,10b$, the smaller the distance between the acoustic probe and shear wave source can also be. Accordingly, the respective signals may be less affected by attenuation in the medium. At the same time, the overall volume of medium can be relatively large, e.g. extend in the tangential direction. For example, the acoustic probe may scan an extended surface of the container while an array of shear wave elements is disposed on the other side as shown in FIGS. 3A-3C In a preferred embodiment, the shear wave element $30s$ is laterally offset with respect to a point directly opposite the acoustic probe e.g. laterally offset with respect to a line coinciding with the acoustic axis A of the acoustic probe 20 or at least one compressional wave transducer $20t$. In one embodiment, the shear wave element $30s$ is configured to generate and inject shear waves Ws into the medium M. For example, the shear waves Ws are generated at a shear wave frequency Fs. Preferably, the shear waves Ws are generated to travel (at least) along a secondary axis B which intersects with the acoustic axis A. For example, the axes A,B, intersect at the object C with a non-zero angle θ. Preferably, the non-zero angle θ between the axes A,B for one or more of the shear wave elements is at least ten degrees, more preferably at least twenty, thirty, fifty, e.g. up to sixty or seventy degrees, or more.

Preferably, the shear waves Ws are configured to cause shear wave oscillations directed transversely, e.g. perpendicular, to the secondary axis B, where the particle displacement is at least partially directed along the acoustic axis A. Typically, the particle displacement vector is perpendicular to the propagation direction in shear waves. So to optimally measure a displacement, the particle displacement vector of the shear waves preferably has a significant component in the direction of the compressional wave, e.g. a direction from which the compressional waves originate. In this way the shear waves Ws can further interact with the object C to cause a change in the measured compressional waves Wc having interacted with the object C. In some embodiments, a processor 40 is configured to determine a measurement of the object C, e.g. an object property and/or image. For example, the measurement is based on the change in the measured compressional waves Wc having interacted with the object C as a function of the (generation of the) shear waves Ws interacting with the object C.

As will be appreciated, the shear waves Ws interacting with the object C can have various effects on the object C which can be measured using the compressional waves Wc. For example, this can be measured as a change in the compressional waves depending on an amount of interaction of the shear waves with the object C. In some embodiments, these effects may include causing local stress/strain changes in the object and/or physically displacing parts of the object (shown exaggerated in FIG. 1B). Typically, these effects can vary as a function of the characteristics of the shear waves such as the shear wave amplitude and phase, relative angle θ between the axes, presence/absence of shear waves, et cetera. Also other factors may influence the measurement, such as the medium/object density, shear wave velocity, compressional wave velocity, viscosity, et cetera. In one embodiment, the measurement of the object C is based on a difference or change of characteristics such as an amplitude or phase of the measured compressional waves Wc as a function of variable characteristics of the 20 shear waves Ws interacting with the object C. For example, subsequent measurements of the compressional waves Wc at different instances of time may coincide with different phases and/or amplitudes of the shear waves Ws interacting with the object C.

In some embodiments, the acoustic microscope system 100 is configured to measure (visco)elastic properties of the one or more objects held by the container 10. For example, the acoustic probe 20 is arranged such that the acoustic axis A coincides with a respective object C. In one embodiment, the acoustic microscope system 100 is configured to determine an image of the object C, e.g. by moving the acoustic probe 20 and/or moving 30 the acoustic axis A along the container 10, or vice versa. For example, the acoustic axis A is scanned along one or more directions (X,Y) over the object C and/or the object is scanned in a direction along the axis (Z), e.g. based on a timing and/or intersection of the acoustic waves (Wc,Ws), to build an image based on measured properties. In one embodiment, the image is based on acoustic impedance differences (stiffness and density differences) within the object and/or compared to a surroundings.

In some embodiments, the measurement of the object C is based on respective frequency components in the measured compressional waves Wc having interacted with the object C. In one embodiment, a respective amplitude and/or phase of the frequency components is used as a measure of interaction of the respective waves with the object. In another or further embodiment, a local stress/strain increase causes by the angled shear wave is measured using the compressional waves as a function of the shear wave. For example, the local stress/strain increase may cause the object to deform/shift, which means that a pulse-echo compressional wave reflection may shift in time (or changes shape). For example, when the object C is affected by the shear waves Ws, the compressional waves Wc having interacted with the object C may comprise shifted frequency components, e.g. caused by a type of Doppler shift on the compressional wave frequency Fc acting on the object at the shear wave frequency Fs. In one embodiment, the known shear wave frequency Fs of the shear waves injected by the shear wave source 30 is used to demodulate the measured compressional waves Wc having interacted with the object C.

In some embodiments, the compressional wave transducer 20t is configured to measure the compressional waves Wc reflected back from the object C. In another or further embodiment, an additional compressional wave transducer (not shown) is arranged on an opposite side of the container to alternatively or additionally measure the compressional waves Wc transmitted through the object C. In a preferred embodiment, the same compressional wave transducer 20t is configured to both inject and measure the compressional waves Wc. For example, the compressional waves Wc may be (predominantly) reflected straight back to the compressional wave transducer 20t along the acoustic axis A. In another or further embodiment (not shown), one or more additional compressional wave transducers can be disposed adjacent each other to alternatively or additionally measure the compressional waves Wc reflected at one or more angles from the object C. For example, the acoustic probe 20 may comprise an array of compressional wave transducers (not shown) to generate and/or measure acoustic waves.

In some embodiments, the measurement of the object C is based (at least in part) on a reflection time of the compressional waves Wc. In other or further embodiments, a transmission time or other transmission characteristic of the compressional waves Wc is measured. In a preferred embodiment, the compressional waves Wc are injected as pulses into the medium M. For example, a respective (roundtrip) time until a reflection of a respective pulse is measured. In another or further embodiment, the propagation of the shear waves Ws is measured by cross-correlation of consecutive pulse echo traces of the compressional waves Wc. In another or further embodiment, the reflected compressional waves are used for imaging or to determine the shear wave speed/modulus at different locations (x,y,z) in the object C and/or container 10. Typically, the shear wave may cause a movement of the object which means the reflector (the object) for the compressional waves may move. In one embodiment, the compressional wave echo from the object can shift in time. In another or further embodiment, as the shear wave moves the object towards the compressional wave transducer the wavelength can be lower and vice versa (like the doppler effect). So there can be a frequency shift. In a preferred embodiment, the processor 40 is configured to calculate a cross-correlation of consecutive pulse echo traces of the compressional waves Wc affected by the shear waves Ws for determining a shear wave modulus of the object C. In one embodiment, the processor 40 is configured to create an image of the object, e.g. based on the shear wave modulus measured at different locations X,Y,Z in the container 10.

Typically, the shear wave velocity is much lower than the compressional wave velocity. For example, the shear wave velocity in tissue or other medium is typically on the order of 5 m/s compared to the compressional wave velocity which is typically on the order of 1500 m/s. In some embodiments, the compressional wave frequency Fc is more than one megahertz. For example, the compressional wave transducer 20t is a MHz and/or GHz acoustic transducer. It can also be envisaged to generate the compressional waves Wc with a bandwidth of different frequencies, e.g. in a range above one megahertz, preferably >10 MHz. In other or further embodiments, the shear wave frequency Fs is lower than the compressional wave frequency Fc by at least a factor ten, preferably at least a factor hundred, thousand, ten thousand, hundred thousand, or more. For example, the shear wave element 30s is configured to generate shear waves Ws at a frequency of least one kilohertz, e.g. at tens to hundreds of kilohertz, preferably above 10 kHz, e.g. between 10 kHz-500 kHz.

In some embodiments, the acoustic probe 20 comprises a probe end 20a arranged and/or configured to contact a wall 10a of the container 10. In one embodiment, the probe end 20a is formed by a rounded tip, e.g. having a radius between 0.1-1 mm. In another or further embodiment, the probe end 20a is configured to push into the wall 10a of the container 10. By providing the probe end 20a with a rounded tip, scratching or other damage to the container wall 10a can be alleviated. For example, the tip of the probe end can be entirely rounded or comprise rounded edges. By pushing the probe end to slightly dent into the wall 10a, contact can be improved. Preferably, the wall 10a of the container 10 is made from a relatively soft and/or flexible (elastic) material such as PMMA or other plastic. Also other materials can be used. For example, the material of the wall has a relatively low elastic modulus compared to a material of the probe end 20a. In one embodiment, the acoustic microscope system 100 is configured to press the acoustic probe 20 against the container wall 10a with a predetermined force, which is preferably constant. For example, the acoustic microscope system 100 comprises a biasing element (not shown) to press the acoustic probe 20 against the container, while the acoustic probe 20 is optionally scanned along the wall 10a.

In some embodiments, the acoustic probe 20 is configured to generate the compressional waves Wc with a focus Pc at or near a boundary Ma of the medium M. In other words, the acoustic probe 20 is configured to generate the compressional waves Wc converging to point or plane forming the focus Pc which is located at or close to the start of the medium M. By placing the focus Pc close to the boundary Ma the position maybe relatively unaffected, e.g. by properties of the sample (medium M and/or objects C). For example, the focus Pc is placed within a distance of less than one millimeter from the boundary Ma, preferably less than hundred micrometers, more preferably less than ten micrometers, or as close to the edge as possible, though most preferably still in the medium M. For example, the compressional waves Wc are transmitted through a wall 10a of the container 10 to form the focus directly behind the wall 10a.

Typically, the compressional wave transducer 20t comprises a piezoelectric material to convert between electrical and acoustic signals. In some embodiments, the compressional wave transducer 20t comprises a layer of piezoelectric material disposed on top of a rounded, e.g. spherical, surface to focus the compressional waves Wc towards a probe end 20a opposite the layer of piezoelectric material, from which probe end 20a the compressional waves Wc are injected into the medium M and/or container 10. In other or further embodiments, the compressional wave transducer 20t comprises an annular array, e.g. series of rings, to focus the acoustic waves by depending on the relative phase between signals to the respective rings. Also other concepts can be used to focus the acoustic waves such as linear arrays and 2D matrix arrays or acoustic horn concepts, or an annular array with delay lines.

Typically, the compressional waves Wc may diverge away from the focus Pc which could affect resolution, e.g. in the near and far field. In a preferred embodiment, measurement data, e.g. obtained from a focused beam of compressional waves Wc, is converted to data corresponding to a pencil beam, wherein the conversion is based on a wavefield migration algorithm. Details of this technique can be found, e.g., in a published article by the present inventors: M. M. Mota, P. L. M. J. van Neer, M. S. van der Heiden and A. W. F. Volker, "Generating a pencil beam from a focused transducer using Stolt migration," 2013 *IEEE International Ultrasonics Symposium IUS*, Prague, 2013, pp. 982-985, doi: 10.1109/ULTSYM.2013.0252. The contents of this article are incorporated herein by reference in their entirety, in particular the technique to generate a pencil beam from a focused transducer. In brief, the article describes scanning using a strongly focused transducer gives a narrow focus depth and locally a high resolution. To obtain a high resolution at every point along the acoustic axis, an imaging algorithm is applied. Because the focal point can be considered as a second source, the wavefield can be split in its causal and anti-causal parts. Imaging can be performed efficiently with a mapping algorithm in the wavenumber domain f-k or Stolt migration, achieving a pencil beam. The enhancement of the resolution using the mapping algorithm effectively created a pencil beam from the focused beam of the transducer in both the simulations and the experiments.

Also other or further techniques can be used to improve imaging, e.g. using trace interpolation techniques and/or compressing sensing. For example, see another article by the present inventors: P. L. M. J. van Neer and A. F. W. Volker, "Imaging beyond aliasing," 2015 *IEEE International Ultrasonics Symposium IUS*, Taipei, 2015, pp. 1-4, doi: 10.1109/ULTSYM.2015.0046. The contents of this article are also incorporated herein by reference in their entirety, in particular the use of trace interpolation techniques and/or compressing sensing. In brief, the article describes that a proper spatial sampling is critical for high quality imaging. If the sampling criterion is not met, artifacts can appear in the image, generally referred to as grating lobes. For inspection efficiency the width of the field of view is becoming larger leading to an increase in the number of elements and therefore transducer complexity and cost. In one embodiment, a matrix of piezo-elements is used to scan a volume using electronic beam steering. Non-aliased radio-frequency RF data is reconstructed from strongly spatially aliased RF data. The reconstruction method involves an iterative scheme using wave field extrapolation. No medium assumptions are made. It includes the following steps: 1 A matrix containing zeros at the locations where signals need to be interpolated is created such that no aliasing occurs. 2 The dataset is inversely extrapolated to focus the wave energy. 3 A threshold is applied to the extrapolated data selecting such that aliasing artifacts are excluded. 4 The dataset is forward extrapolated such that the input data is obtained. Now the empty traces contain signal. 6 The original RF dataset is copied into the reconstructed dataset. 7 Steps 2-6 are performed iteratively using a progressively lower threshold. Aliased and non-aliased datasets were modeled based on point diffractors and reflectors of increasing width. For example, the datasets can be imaged using a wavenumber-frequency domain mapping.

Figure 2B:
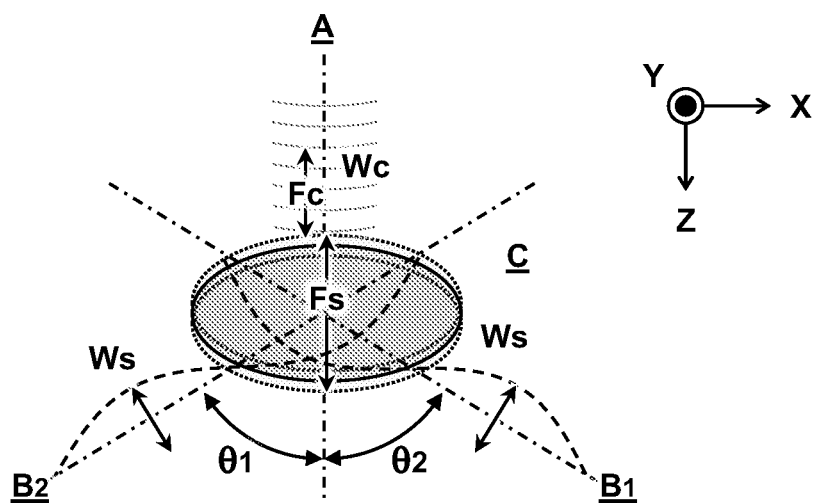
FIG. 2B illustrates corresponding compressional and shear waves interacting with an object.

FIG. 2A illustrates an acoustic microscope system 100 with multiple shear wave element 30s. FIG. 2B illustrates corresponding acoustic waves Wc,Ws interacting with an object C.

In some embodiments, the shear wave source 30 comprises at least two shear wave elements 30s. Preferably, the at least two shear wave elements 30s are each disposed with a lateral offset DX with respect to the acoustic axis A of the acoustic probe 20. The shear wave source 30 may also comprise further shear wave element 30s that may be disposed in other locations, even at or near the acoustic axis A. In one embodiment, the two or more shear wave elements 30s are configured to generate and inject shear waves Ws at the (same) shear wave frequency Fs into the medium M. Preferably, the shear waves Ws generated by the at least two shear wave elements 30s may each travel along a respective secondary axis B1,B2 which intersect with the acoustic axis A at the object C with a respective non-zero angle θ1, θ2 between the axes A,B1 and A,B2. In a preferred embodiment, the shear waves Ws of the at least two shear wave elements 30s are generated with a relative phase configured to cause respective shear wave oscillations that arrive in phase at the object in a direction +Z or −Z along the acoustic axis A, e.g. amplify each other in a direction +Z or —Z along the acoustic axis A and/or (partially) cancel each other at the object C in a direction X transverse (perpendicular) to the acoustic axis A.

FIG. 3A illustrates an acoustic probe 20 scanned along different dimensions X,Y of a container 10. In some embodiments, e.g. as shown, the shear wave source 30 comprises an array of shear wave element 30s, preferably disposed on a bottom of the container 10 opposite to the medium M from the acoustic probe 20. For example, the array of shear wave element 30s is arranged to form a linear configuration, a two dimensional matrix, or a or rectangular bracket. Also other configurations can be envisaged. In one embodiment, the acoustic microscope system 100 comprises a set of actuators (not shown) configured to scan the acoustic probe 20 across a wall 10a of the container 10. In another or further embodiment, the processor 40 is configured to determine an image of the object C based on the measured compressional waves Wc at different positions X,Y of the acoustic probe 20 along a surface of the wall 10a. In a preferred embodiment, the shear wave source 30, e.g. array of shear wave elements 30s, is configured to modify the generation of shear waves depending on the position (X,Y) of the acoustic probe 20. For example, the generation of shear waves is modified by using different shear wave elements and/or different phases to enhance a shear wave amplitude along the acoustic axis, e.g. in the main downward direction of the compressional waves below the acoustic probe 20.

FIG. 3B illustrates an acoustic probe 20 elongated in a first dimension Y scanned along a second dimension X of the container 10. In some embodiments, e.g. as shown, the acoustic microscope system 100 comprises an array of compressional wave transducers 20t arranged along at least a first dimension Y. In another or further embodiment, the acoustic microscope system 100 comprises an actuator (not shown) configured to scan the acoustic probe 20 across a wall 10a of the container 10 in a second dimension X transverse to the first dimension. In another or further embodiment, the processor 40 is configured to determine an image of the object C based on the measured compressional waves Wc at different compressional wave transducers 20t along the first dimension Y and different positions Y of the acoustic probe 20 along the second dimension X. For example, instead of having a single beam generator and a roughly circular tip-chip contact area, it can be envisaged to use a 1D or 1.5D array in combination with an elongated tip-container contact area (e.g. elliptical or rectangular) to create a 'sheet' of sound or a series of beams. One advantage of this can be to improve scan speed/time and/or higher SNR at the same scan speed.

FIG. 3C illustrates an acoustic probe 20 comprising a two-dimensional array of compressional wave transducers. In some embodiments, e.g. as shown, the acoustic microscope system 100 comprises a two-dimensional array of compressional wave transducers 20t. In one embodiment, the processor 40 is configured to determine an image of the object C based on the measured compressional waves Wc at different compressional wave transducers 20t along the two dimensions X,Y. For example, the embodiment of FIG. 3B can be extended to encompass a 2D array of beams and a large tip-container contact area (e.g. square). One advantage can be that the need for scanning may be minimized or eliminated. For example, the focusing can be done electronically.

In some embodiments, the acoustic probe 20 is directly contacting the medium M, e.g. submerged into the medium M. In other words the container wall 10a can be omitted. This is particularly advantageous in combination with an acoustic probe 20 comprising an array of compressional wave transducers 20t that do not need to move through the medium M. For example, a two-dimensional array of compressional wave transducers 20t can be at least partially submerged and kept stationary in the medium M at an open (top) side of the container 10. One advantage of such arrangement can be that the travel distance in the medium may be minimized and/or the frequency/resolution can be maximized. Using either a 1D or 2D array of compressional wave transducers 20t in transmission a plane wave may be used. For example, beamforming can be done in reception.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. An acoustic microscope system comprising:
a container configured to hold a medium with an object to be measured disposed in the medium, wherein the container has a first side and a second side, wherein the first side and the second side form opposite sides of the container configured to hold the medium there between;
an acoustic probe comprising a compressional wave transducer disposed on the first side of the container and configured to carry out operations of:
generating compressional waves, at a compressional wave frequency into the medium, traveling along an acoustic axis to interact with the object disposed along the acoustic axis, wherein the acoustic axis is directed from the first side of the container towards the second side of the container, and
obtaining a measurement of the compressional waves having interacted with the object along the acoustic axis;
a shear wave source comprising at least one shear wave element disposed on the second side of the container, opposite the acoustic probe and laterally offset with respect to the acoustic axis from the acoustic probe through the object, wherein the at least one shear wave element is configured to generate shear waves at a shear wave frequency into the medium traveling along a secondary axis that intersects with the acoustic axis at the object with a non-zero angle, wherein the shear waves are configured to cause shear wave oscillations that are directed transverse to the secondary axis and that are at least partially directed along the acoustic axis for further interacting with the object to cause a change in the measurement of the compressional waves having interacted with the object; and
a processor configured to determine a measurement of the object based on the change in the measurement of the compressional waves having interacted with the object as a function of the generation of the shear waves interacting with the object.

2. The system according to claim 1, wherein the compressional wave frequency is more than one megahertz and the shear wave frequency is between 1 kHz-500 kHz.

3. The system according to claim 1, wherein the measurement of the object is based on respective frequency components in the measurement of the compressional waves having interacted with the object.

4. The system according to claim 1, wherein the compressional wave transducer is configured to measure the compressional waves reflected back from the object, wherein the compressional wave transducer is configured to both inject and measure the compressional waves.

5. The system according to claim 1, wherein the processor is configured to calculate a cross-correlation or Doppler shift of consecutive pulse echo traces of the compressional waves affected by the shear waves for determining a shear wave modulus of the object, and wherein the processor is configured to create an image of one or more objects in the medium based on a shear wave modulus of the one or more objects measured at different locations in the container.

6. The system according to claim 1, wherein the acoustic probe comprises a probe end formed by a rounded tip configured to push into a wall of the container for transmitting the compressional waves through the wall into the medium, and wherein the acoustic probe is configured to generate the compressional waves with a focus at a boundary of the medium.

7. The system according to claim 1, wherein the compressional wave transducer comprises a layer of piezoelectric material disposed on top of a rounded surface to focus the compressional waves towards a probe end, which is opposite the layer of piezoelectric material, from which the compressional waves are injected into the medium and/or container.

8. The system according to claim 1, wherein the processor is configured for converting measurement data, obtained from a focused beam of compressional waves, to data corresponding to a pencil beam, wherein the converting measurement data is based on a wavefield migration algorithm.

9. The system according to claim 1, wherein the shear wave source comprises at least two shear wave elements disposed on the second side of the container, wherein the at least two shear wave elements are disposed with a respective lateral offset on opposite sides of the acoustic axis of the acoustic probe and configured to generate and inject shear waves at the same shear wave frequency into the medium traveling along a respective secondary axis which both intersect with the acoustic axis at the object with a respective non-zero angle between the axes, and wherein the shear waves of the at least two shear wave elements are generated with a relative phase configured to cause respective shear wave oscillations that arrive in phase at the object at least in a direction along the acoustic axis.

10. The system according to claim 1, wherein the shear wave source comprises an array of shear wave element, disposed on the second side of the container opposite to the medium from the acoustic probe.

11. The system according to claim 1, wherein the acoustic microscope system comprises a set of actuators configured to scan the acoustic probe across a wall of the container, and wherein the processor is configured to determine an image of the object based on the measurement of the compressional waves at different positions of the acoustic probe along a surface of the wall.

12. The system according to claim 1, wherein the compression wave transducer comprises an array of compressional wave transducers arranged along at least a first dimension, wherein the acoustic microscope system comprises an actuator configured to scan the acoustic probe across a wall of the container in a second dimension transverse to the first dimension, and wherein the processor is configured to determine an image of the object based on the measurement of the compressional waves at different compressional wave transducers along the first dimension and different positions of the acoustic probe along the second dimension.

13. The system according to claim 1, wherein the acoustic microscope system comprises a two-dimensional array of compressional wave transducers, wherein the processor is configured to determine an image of the object based on the measurement of the compressional waves at different compressional wave transducers along the two dimensions.

14. A method for measuring an object disposed in a medium, the method comprising:
generating, by an acoustic probe comprising a compressional wave transducer disposed on a first side of the medium, compressional waves, at a compressional wave frequency into the medium, traveling along an acoustic axis to interact with the object;
generating, by a shear wave source comprising at least one shear wave element disposed on a second side of the medium, shear waves at a shear wave frequency into the medium, wherein the medium is disposed between the compressional wave transducer and the at least one shear wave element, wherein the shear wave element is disposed on the second side laterally offset with respect to the acoustic axis, which extends from the acoustic probe through the object, to generate the shear waves traveling along a secondary axis which intersects with the acoustic axis at the object with a non-zero angle, wherein the shear waves cause shear wave oscillations directed transverse to the secondary axis and at least partially directed along the acoustic axis for further interacting with the object to cause a change in measured compressional waves having interacted with the object;
obtaining a measurement of the change in the compressional waves having interacted with the object while the shear waves further interact with the object; and
determining a measurement of the object based on the measurement of the change in the compressional waves having interacted with the object as a function of the generation of the shear waves interacting with the object.

15. The method according to claim 14, wherein the measured object is one of a plurality of biological cells disposed in a medium comprising one or more of a viscous liquid, gel, or tissue.

16. The method according to claim 14, comprising calculating a cross-correlation or Doppler shift of consecutive pulse echo traces of the compressional waves affected by the shear waves for determining a shear wave modulus of the object, and creating an image of one or more objects in the medium based on a shear wave modulus of the one or more objects measured at different locations in the container.

17. The method according to claim 14, comprising converting measurement data, obtained from a focused beam of compressional waves, to data corresponding to a pencil beam, wherein the converting measurement data is based on a wavefield migration algorithm.

18. The method according to claim 14, wherein the acoustic probe is scanned across a wall of the container, and an image of the object is determined based on the measurement of the compressional waves at different positions of the acoustic probe along a surface of the wall.

19. The method according to claim 14, wherein the acoustic probe comprises an array of compressional wave transducers arranged along at least a first dimension, wherein the acoustic probe is scanned across a wall of the container in a second dimension transverse to the first dimension, wherein determine an image of the object is determined based on the measurement of the compressional waves at different compressional wave transducers along the first dimension and different positions of the acoustic probe along the second dimension.

20. The method according to claim 14, wherein the acoustic probe comprises a two-dimensional array of compressional wave transducers, wherein an image of the object is determined based on the measurement of the compressional waves at different compressional wave transducers along the two dimensions.

* * * * *